(12) United States Patent
Barrow

(10) Patent No.: US 7,380,366 B1
(45) Date of Patent: Jun. 3, 2008

(54) BOBBER-PLANER FOR SLOW TROLLING

(76) Inventor: Bill Windsor Barrow, 945 Mewborn Church Rd., Snow Hill, NC (US) 28580

( * ) Notice: Subject to any disclaimer, the term of this patent is extended or adjusted under 35 U.S.C. 154(b) by 0 days.

(21) Appl. No.: 10/906,587

(22) Filed: Feb. 25, 2005

(51) Int. Cl.
*A01K 91/08* (2006.01)
(52) U.S. Cl. ............................. 43/43.13; 43/42.22
(58) Field of Classification Search ............ 43/43.13, 43/9.7, 43.12, 42.22, 42.23
See application file for complete search history.

(56) References Cited

U.S. PATENT DOCUMENTS

| | | | | |
|---|---|---|---|---|
| 1,188,583 A * | 6/1916 | Townsend | ............ | 43/42.22 |
| 1,361,067 A * | 12/1920 | Jordan | ............ | 43/42.22 |
| 1,606,240 A * | 11/1926 | Klaserner | ............ | 43/43.13 |
| 1,923,623 A * | 8/1933 | Hoage | ............ | 43/42.23 |
| 2,247,583 A * | 7/1941 | Louthan | ............ | 43/43.13 |
| 2,561,515 A * | 7/1951 | Keeler | ............ | 43/42.22 |
| 2,563,386 A * | 8/1951 | Wight, Jr. | ............ | 43/42.22 |
| 2,582,754 A * | 1/1952 | Kahler | ............ | 43/43.13 |
| 2,608,790 A * | 9/1952 | McFarland | ............ | 43/42.22 |
| 2,622,362 A * | 12/1952 | Jensen | ............ | 43/43.13 |
| 2,789,386 A * | 4/1957 | Creelman | ............ | 43/43.13 |
| 2,816,385 A * | 12/1957 | Luketa | ............ | 43/9.7 |
| 2,825,994 A * | 3/1958 | Bruhn | ............ | 43/43.13 |
| 2,883,787 A * | 4/1959 | Dahl | ............ | 43/43.13 |
| 2,914,884 A * | 12/1959 | Dahl | ............ | 43/43.13 |
| 2,923,085 A * | 2/1960 | Dahl | ............ | 43/43.13 |
| 2,933,848 A * | 4/1960 | Tollefson | ............ | 43/43.13 |
| 3,044,208 A * | 7/1962 | Minera | ............ | 43/43.13 |
| 3,134,189 A * | 5/1964 | Hubbart | ............ | 43/43.13 |
| 3,145,498 A * | 8/1964 | Kochis | ............ | 43/43.13 |
| 3,153,298 A * | 10/1964 | Lemon | ............ | 43/43.13 |
| 3,156,065 A * | 11/1964 | Klammer | ............ | 43/43.13 |
| 3,181,266 A * | 5/1965 | Lenfvenius | ............ | 43/43.13 |
| 3,201,889 A * | 8/1965 | Jackson | ............ | 43/9.7 |
| 3,216,147 A * | 11/1965 | Minera | ............ | 43/43.13 |
| 3,230,660 A * | 1/1966 | Meyers | ............ | 43/43.13 |
| 3,318,038 A * | 5/1967 | Delsol | ............ | 43/43.13 |
| 3,401,483 A * | 9/1968 | Bellah et al. | ............ | 43/43.13 |
| 3,464,142 A * | 9/1969 | Hubbart | ............ | 43/43.13 |
| 3,529,376 A * | 9/1970 | Parmeson | ............ | 43/43.13 |
| D221,849 S * | 9/1971 | Spade | ............ | 43/43.13 |
| 3,760,762 A * | 9/1973 | Spongberg | ............ | 43/43.13 |
| 3,796,000 A * | 3/1974 | Nye | ............ | 43/43.13 |
| 3,808,727 A * | 5/1974 | Flanders | ............ | 43/43.13 |
| 3,818,624 A * | 6/1974 | Duffy | ............ | 43/43.13 |
| 3,898,759 A * | 8/1975 | Jensen | ............ | 43/43.13 |
| 3,949,512 A * | 4/1976 | Stegemeyer | ............ | 43/43.13 |
| 3,971,153 A * | 7/1976 | Harms | ............ | 43/43.13 |
| 4,161,841 A * | 7/1979 | Holstein | ............ | 43/43.13 |
| 4,254,573 A * | 3/1981 | Mastropaolo | ............ | 43/43.13 |
| 4,461,115 A * | 7/1984 | Carrillo | ............ | 43/43.13 |
| 4,486,970 A * | 12/1984 | Larson | ............ | 43/43.13 |

(Continued)

FOREIGN PATENT DOCUMENTS

DE    4338138 A1 * 5/1994

(Continued)

*Primary Examiner*—Darren W Ark
(74) *Attorney, Agent, or Firm*—John F. Bohland

(57) ABSTRACT

A trolling device comprising an elongated body, an adjustable planar guide fin, and an adjustable rudder. The guide fin and rudder are adjusted to optimize trolling performance on either the port or starboard side of a boat.

8 Claims, 5 Drawing Sheets

U.S. PATENT DOCUMENTS

| | | | | |
|---|---|---|---|---|
| 4,524,538 A | * | 6/1985 | Halvorsen | 43/43.13 |
| 4,858,370 A | * | 8/1989 | Ryder | 43/43.13 |
| 5,018,296 A | * | 5/1991 | Putz, II | 43/43.13 |
| 5,185,951 A | * | 2/1993 | Hemmerle | 43/43.13 |
| 5,339,561 A | * | 8/1994 | Weber | 43/43.13 |
| 5,355,615 A | * | 10/1994 | Spickelmire | 43/43.13 |
| 5,548,919 A | * | 8/1996 | Hicks | 43/43.13 |
| 5,636,467 A | * | 6/1997 | Adams | 43/43.13 |
| 5,867,932 A | * | 2/1999 | Reiger | 43/43.13 |
| 6,412,215 B1 | * | 7/2002 | Even | 43/43.13 |
| 6,493,984 B1 | * | 12/2002 | Bechhold | 43/43.13 |
| 6,658,784 B1 | * | 12/2003 | Mastropaolo | 43/43.13 |

FOREIGN PATENT DOCUMENTS

| | | | | |
|---|---|---|---|---|
| GB | 2272620 A | * | 5/1994 | |
| JP | 09056312 A | * | 3/1997 | |

* cited by examiner

BOBBER-PLANER FOR SLOW TROLLING

BACKGROUND OF THE INVENTION

The present invention relates to fishing devices. More particularly, the present invention relates to bobbers and planers for slow trolling.

Trolling is a popular method of fishing for many recreational species. It is a particularly effective method for certain species in their preferred habitats. However, special devices such as planers, downriggers, and outriggers must be used to put the baits at the desired depth and horizontal distance from the boat. This is especially true when, as is usually the case, it is desired to deploy multiple lines in order to increase the probability of catching a fish. In addition to placing the baits in the desired positions, the above fishing devices enable multiple fishing lines to be spatially separated to minimize entanglement.

Planers are grouped in two general categories, depth planers and side planers. Depth planers are usually non-buoyant and use a single planar surface that drives the device deep into the water when it is towed behind a slow moving boat. Side planers, are usually buoyant and have one or more planar surfaces to drive the device to either the starboard or port side of the towing vessel.

U.S. Pat. No. 5,548,919, incorporated herein by reference, describes a planar board having a buoyant body with weights that are adjustable for fishing on the port or starboard side of the boat.

U.S. Pat. No. 5,185,951, incorporated herein by reference, describes a trolling device designed to carry a fishing line horizontally away from a boat by means of a fixed keel and rudder. The orientation of the rudder relative to the keel determines whether the device operates on the port or starboard side of the boat. Since the rudder is fixed, individual devices are specifically made for either starboard or port use; they are not adaptable for use on either side.

U.S. Pat. No. 3,181,266, incorporated herein by reference, describes a planar trolling device having a buoyant body with a weighted keel suitable for moving a line horizontally away from a boat. The fishing line is held by a clamping arm that is movable from one side of the body to the other, thereby allowing trolling on the starboard or port side of the boat.

SUMMARY OF THE INVENTION

It is an object of the present invention to provide a trolling device that can be easily adapted for trolling on the port or starboard side of a boat.

It is a further object of the present invention to provide a low-cost trolling device having a small number of easily manufactured parts.

A trolling device according to the present invention comprises an elongated buoyant body with a planar guide fin and a planar rudder. The guide fin and rudder are movable to different positions depending on whether starboard or port side trolling is desired.

DETAILED DESCRIPTION OF A PREFERRED EMBODIMENT OF THE INVENTION

Figure 1:
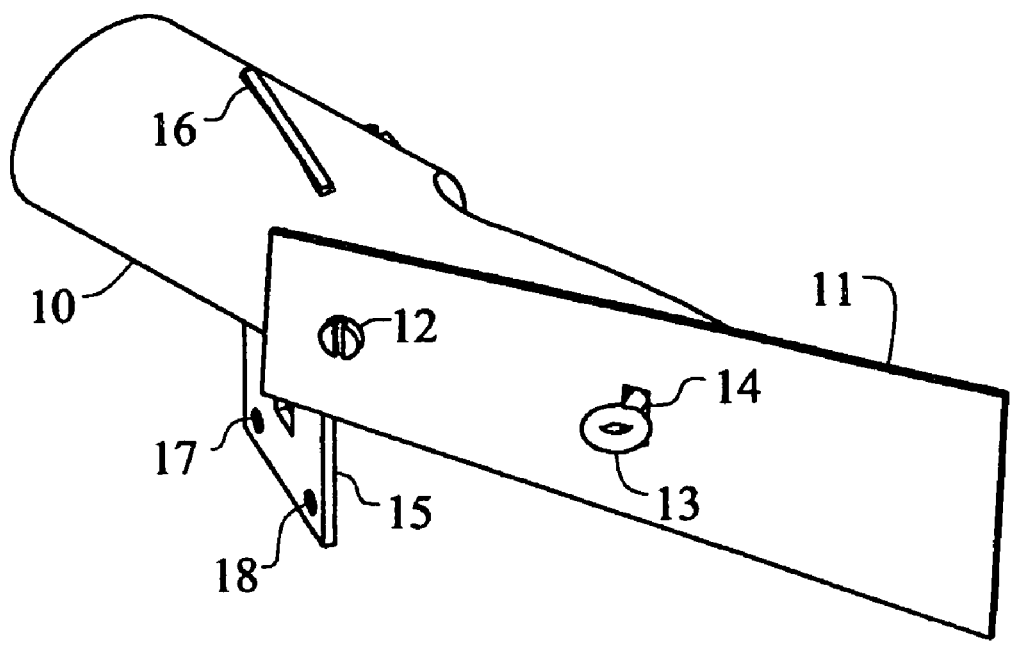
FIG. 1 is an isometric view of a bobber-planer according to the present invention rigged to troll on the port side of a boat, approximately as viewed from the boat.
Figure 2:
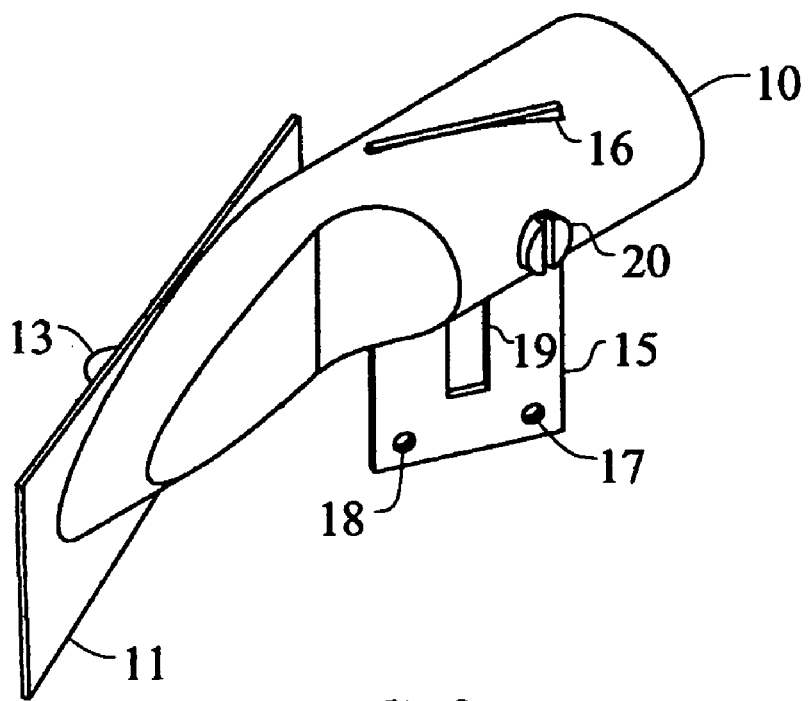
FIG. 2 is a different view of the bobber-planer shown in FIG. 1.
Figure 3:
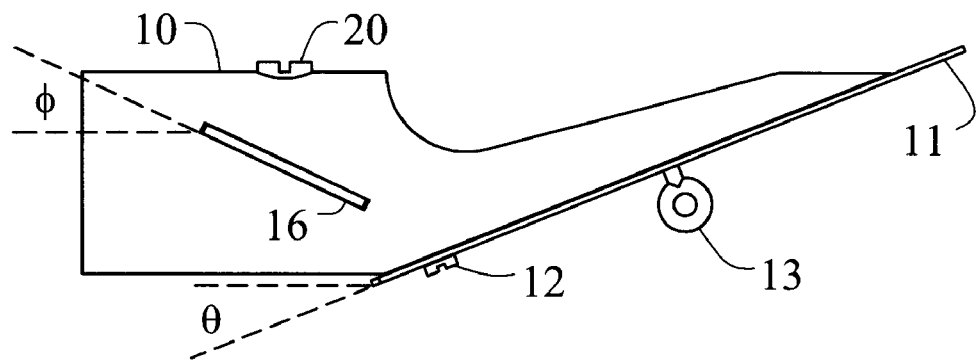
FIG. 3 is a top view of the bobber-planer shown in FIG. 1.
Figure 4:
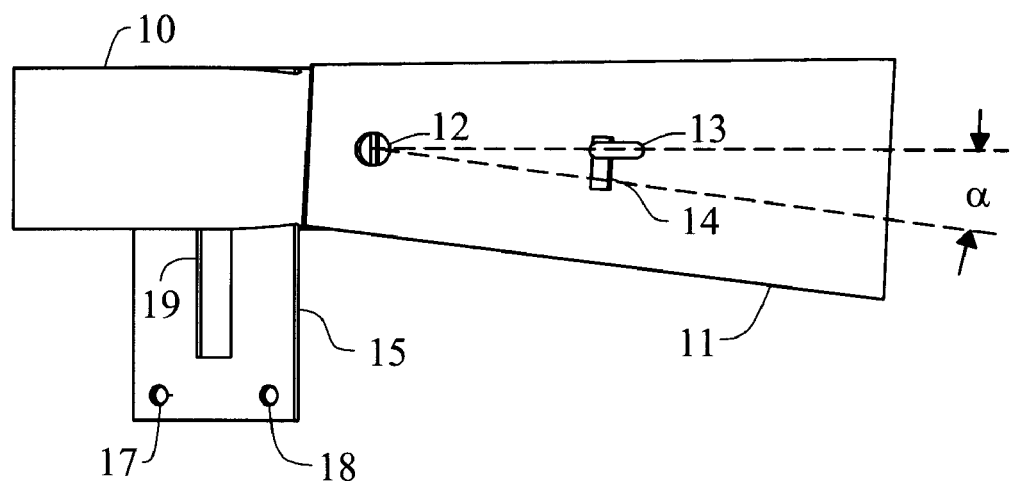
FIG. 4 is a side view of the bobber-planer shown in FIG. 1.

FIGS. 1, 2, 3, and 4 show a bobber-planer according to the present invention rigged for trolling on the port side of a boat. The body (10) of the device is fabricated from an elongated section of buoyant material. Although the cross-section shown is substantially elliptic, other shapes such as round, square, and rectangular are also suitable. The forward portion of the body is tapered to improve hydrodynamic performance. Suitable materials for the body include wood, plastic, and other materials that are buoyant or can be made to be buoyant. The taper in the forward portion of the body is produced by machining or molding. A planar guide fin (11) is rotatably attached to the body by a screw (12) or other fastening means. The planar guide fin is in a substantially vertical plane that intersects the long axis of the horizontally elongated body at an angle of $\theta$. Preferably, the angle $\theta$ is between ten degrees and forty degrees. More preferably, $\theta$ is between fifteen degrees and thirty degrees. A screw eye (13) or other means for attaching a trolling line passes through a rectangular aperture (14) in the guide fin and is secured in the body. The planar guide fin may be fabricated from plastic, wood, metal, or other suitable material. The length of the rectangular aperture defines the rotational limits of the planar guide fin. As shown in the figures, the planar guide fin is moved to the "down" side relative to the body, and this position depends on whether the device is being trolled on the port or starboard side. Preferably, the total range of rotational movement of the planar guide fin, $\alpha$, is between five and twenty degrees. More preferably, $\alpha$ is between five and twelve degrees.

Figure 5:
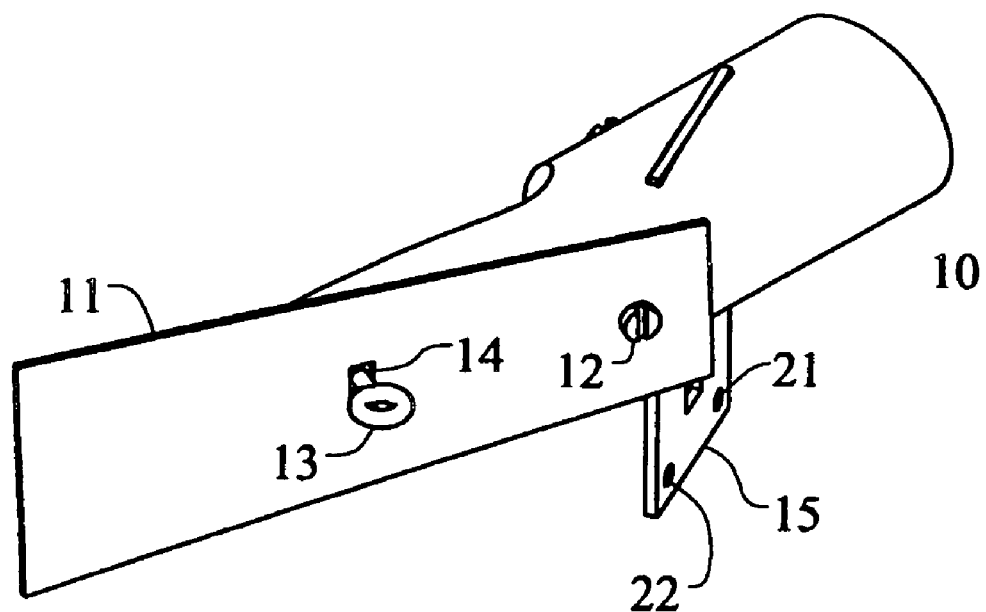
FIG. 5 is an isometric view of a bobber-planer according to the present invention rigged to troll on the starboard side of a boat, approximately as viewed from the boat.
Figure 6:
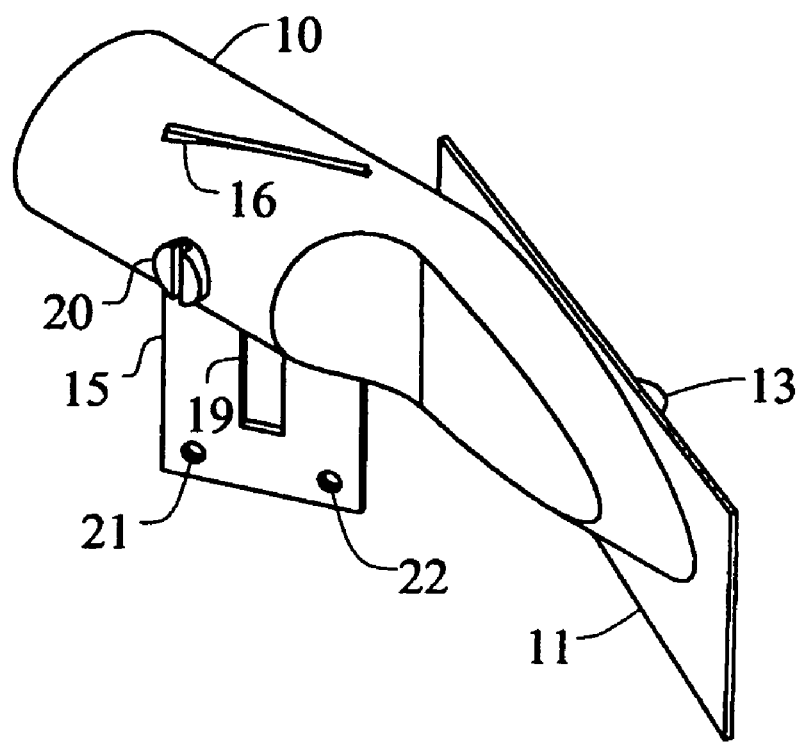
FIG. 6 is a different view of the bobber-planer shown in FIG. 5.
Figure 7:
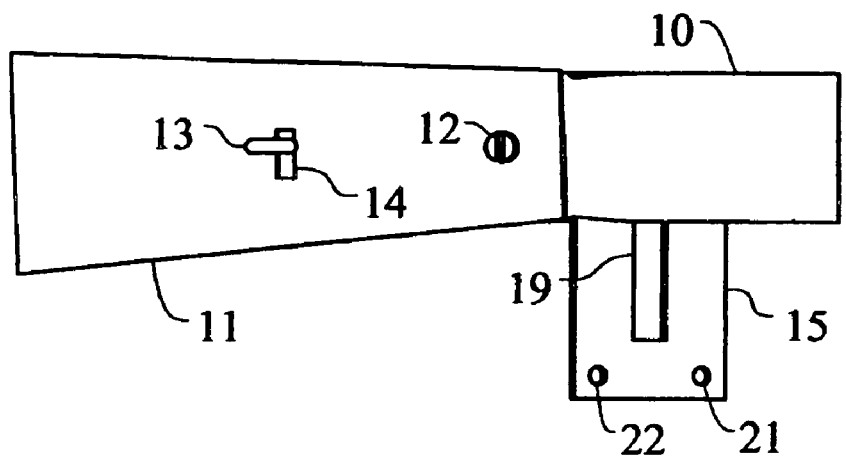
FIG. 7 is a side view of the bobber planer shown in FIG. 5.

A rudder (15) is slidably constrained within a slot (16) in the body. The slot, and hence the plane of the rudder, intersects the long axis of the body at an angle of $\phi$. Preferably $\phi$ is between twenty and fifty degrees. More preferably, $\phi$ is between thirty and forty degrees. Note that the rudder angle is measured in a direction opposite to that used for measuring the planar guide fin angle, $\theta$. The acute angle between the planar guide fin and the rudder is then $\theta+\phi$. The rudder is used in whichever position is "down" when trolling on the port or the starboard side. The rudder has a trailing aperture (17) and a leading aperture (18), either one of which may be used to attach a line to a fishing lure or bait when trolling on the port side of the boat. The rudder has an elongated aperture (19) through which a screw, pin, or other means passes through to limit the motion of the rudder in the slot. When trolling on the starboard side of the boat, as shown in FIGS. 5, 6, and 7, the rudder is moved to the down position, thereby exposing the trailing aperture (21) and the leading aperture (22) for attaching a line to a fishing lure or bait. In addition to the planar surface for guiding the bobber-planer, the rudder provides ballast to aid in keeping the device upright. Preferred materials for the rudder have specific gravities greater than two. Suitable copper and iron alloys are especially preferred because they offer relatively low cost, moderately high density, high strength, and reasonably high corrosion resistance. Stainless steel and bronze are especially preferred materials.

Figure 8:
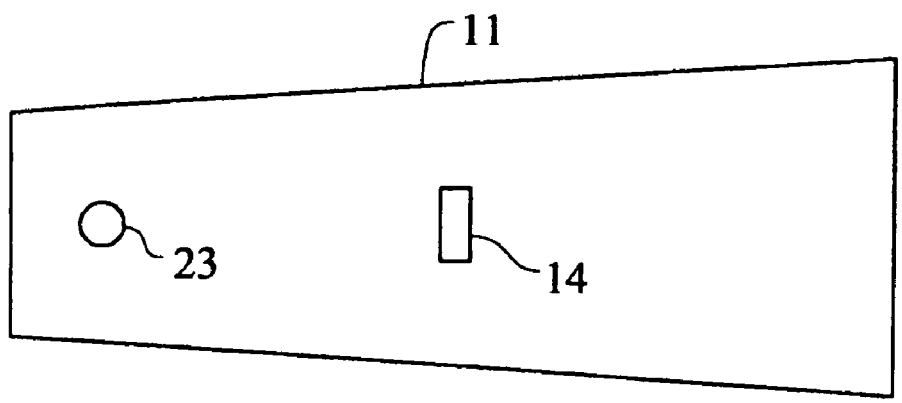
FIG. 8 shows a planar guide fin as used in a bobber-planer according to the present invention.

FIG. 8 shows the details of a planar guide fin (11) without the other components. A substantially circular aperture (23) provides an attachment point allowing rotation of the planar guide fin over a rotational range defined by the length of the rectangular aperture (14).

Figure 9:
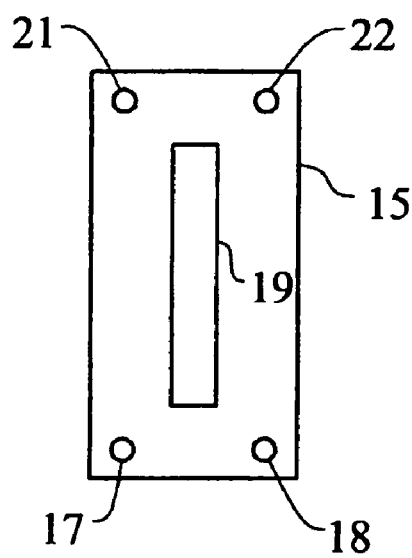
FIG. 9 is a rudder as used in a planer-bobber according to the present invention.

FIG. 9 shows the details of a rudder (15) without the other components. The length of elongated aperture (19) defines the range of motion of the rudder in slot (16) of the body (10). When the bobber-planer is set for port-side trolling, apertures (17) and (18) are available for attaching a line or leader to a fishing lure or bait; when set for starboard-side trolling, apertures (21) and (22) are available for this purpose.

Figure 10:
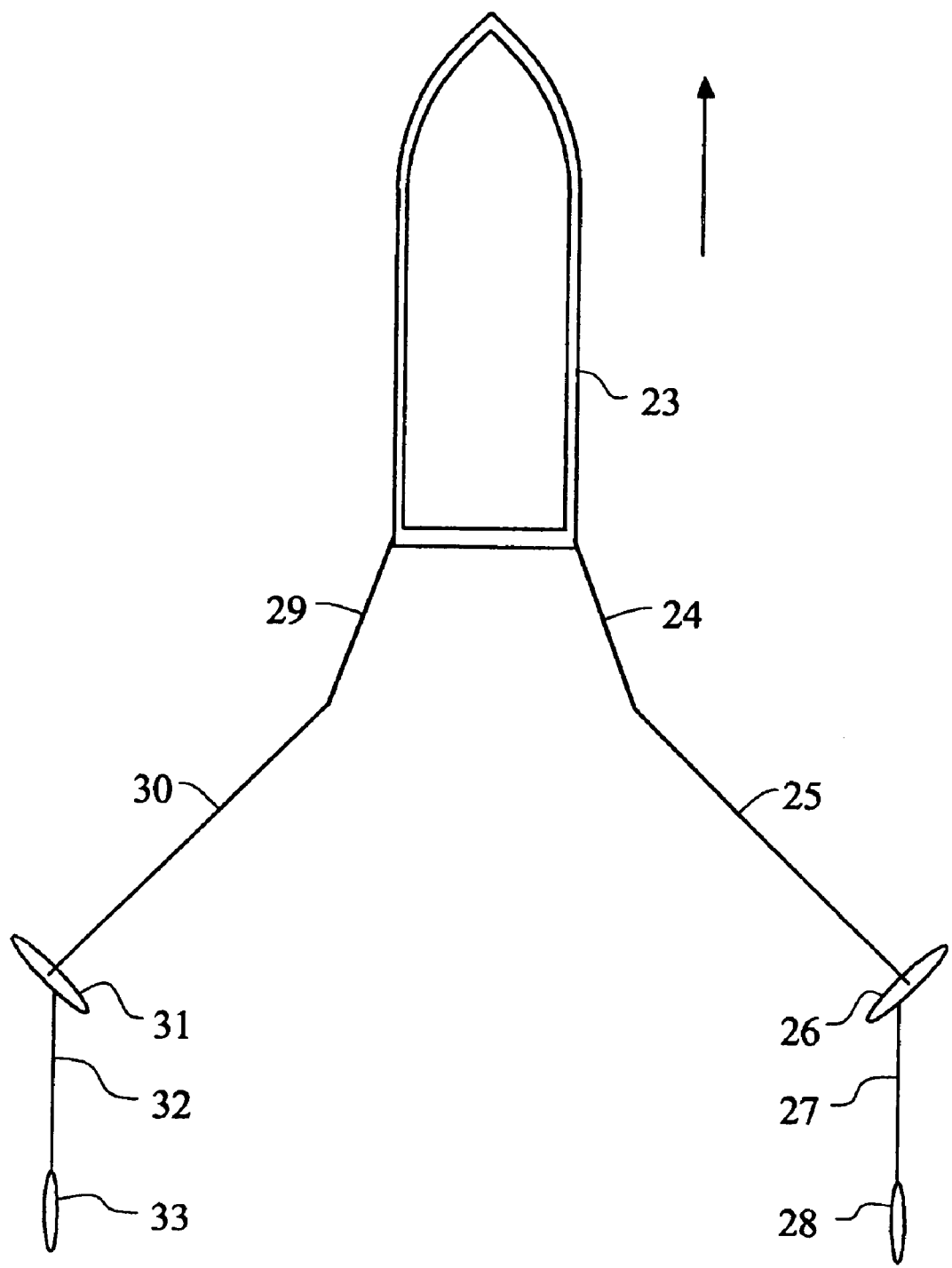
FIG. 10 shows bobber-planers being used to troll on the starboard and port sides of a boat.

FIG. 10 shows schematically a method for using bobber-planers according to the present invention. A boat (23) is moving forward at a speed of 0.5 to 6 knots or, more preferably, 1 to 3 knots. A starboard fishing rod (24) has starboard fishing line (25) running to a starboard-side bobber-planer (26). A starboard leader (27) is attached to a starboard fishing bait (28). A port fishing rod (29) has port fishing line (30) running to a port-side bobber-planer (31). A port leader (32) is attached to a port fishing bait (33).

What is claimed is:

1. A trolling device comprising:
    a horizontally elongated body having a long axis and further having a substantially vertical slot wherein the plane of said substantially vertical slot intersects the long axis of said horizontally elongated body at an angle of $\phi$,
    a planar guide fin having an attachment point,
    means for rotatably attaching said planar guide fin to said horizontally elongated body at said attachment point, wherein said planar guide fin both is in a substantially vertical plane that intersects the long axis of said horizontally elongated body at an angle of $\theta$ and rotates about an axis which is perpendicular to a plane in which the planar guide fin extends, and wherein a range of angular rotation of said planar guide fin about said attachment point is $\alpha$,
    a rudder slidably constrained within said substantially vertical slot,
    means for limiting the sliding motion of said rudder,
    means for attaching a fishing line, and
    means for attaching a fishing leader.

2. The trolling device of claim 1 wherein $\theta$ is between ten and forty degrees, $\phi$ is between twenty and fifty degrees, and $\alpha$ is between five and twenty degrees.

3. The trolling device of claim 2 wherein $\theta$ is between fifteen and thirty degrees, $\phi$ is between thirty and forty degrees, and $\alpha$ is between five and twelve degrees.

4. The trolling device of claim 1 wherein a material of said horizontally elongated body is wood.

5. The trolling device of claim 1 wherein a material of said horizontally elongated body is plastic.

6. The trolling device of claim 1 wherein a material of said rudder is an iron alloy.

7. The trolling device of claim 1 wherein a material of said rudder is a copper alloy.

8. The trolling device of claim 3 wherein a material of said horizontally elongated body is plastic and a material of said rudder is an iron alloy.

* * * * *